United States Patent [19]

Degen et al.

[11] Patent Number: 4,855,343
[45] Date of Patent: * Aug. 8, 1989

[54] PAPER SIZE BASED ON FINELY DIVIDED AQUEOUS DISPERSIONS

[75] Inventors: Hans-Juergen Degen, Lorsch; Fritz Reichel, Hirschberg; Ulrich Riebeling, Schifferstadt; Lothar Hoehr, Worms, all of Fed. Rep. of Germany

[73] Assignee: BASF Aktiengesellschaft, Ludwigshafen, Fed. Rep. of Germany

[*] Notice: The portion of the term of this patent subsequent to May 30, 2006 has been disclaimed.

[21] Appl. No.: 74,031

[22] Filed: Jul. 16, 1987

[30] Foreign Application Priority Data

Aug. 14, 1986 [DE] Fed. Rep. of Germany ....... 3627594

[51] Int. Cl.$^4$ ................................................. D21H 3/46
[52] U.S. Cl. ........................................ 524/47; 524/48; 524/734; 524/820; 524/831
[58] Field of Search ................... 524/47, 48, 732, 734, 524/820, 827, 831, 832

[56] References Cited

U.S. PATENT DOCUMENTS

| | | | |
|---|---|---|---|
| 3,061,471 | 10/1962 | Brockway et al. | 527/312 |
| 3,061,472 | 10/1962 | Brockway | 527/314 |
| 3,785,921 | 1/1974 | Ide et al. | 524/734 |
| 4,301,017 | 11/1981 | Kightlinger et al. | 527/314 |
| 4,560,724 | 12/1985 | Brabetz et al. | 524/734 |
| 4,659,431 | 4/1987 | Probst et al. | 162/168.2 |
| 4,670,505 | 6/1987 | Craig | 524/732 |

FOREIGN PATENT DOCUMENTS

| | | |
|---|---|---|
| 2163850 | 7/1973 | Fed. Rep. of Germany . |
| 115196 | 11/1984 | Japan . |
| 1430174 | 3/1976 | United Kingdom . |

OTHER PUBLICATIONS

Paquin: "Über Umsetzungen von Harnstoff mit Alkoholen", (1946), pp. 518–523, with partial English translation.

Primary Examiner—John Kight
Assistant Examiner—Nathan M. Nutter
Attorney, Agent, or Firm—Oblon, Spivak, McClelland, Maier & Neustadt

[57] ABSTRACT

Sizes for paper are based on finely divided aqueous dispersions of copolymers which are obtainable by copolymerization of from 10 to 56 parts by weight of a monomer mixture of
(a) from 20 to 65% by weight of (meth)acrylonitrile,
(b) from 35 to 80% by weight of one or more acrylates of monohydric, saturated $C_3$–$C_8$-alcohols and
(c) from 0 to 10% by weight of other ethylenically unsaturated copolymerizable monomers by an emulsion polymerization method in 100 parts by weight of an aqueous solution of from 1.7 to 25% by weight of a degraded starch having a viscosity $\eta_i$ of from 0.12 to 0.50 dl/g, at from 40° to 100° C. in the presence of a peroxide-containing initiator.

6 Claims, No Drawings

PAPER SIZE BASED ON FINELY DIVIDED AQUEOUS DISPERSIONS

U.S. Pat. No. 3,061,471 discloses that acrylates which are derived from alcohols of 2 to 4 carbon atoms can be polymerized in the presence of free radical polymerization initiators in an aqueous solution of starch. The stable aqueous dispersions obtained are used as sizes. According to U.S. Pat. No. 3,061,472, the polymerization of acrylates which are derived from alcohols of 2 to 4 carbon atoms is carried out in aqueous solutions of starch and furthermore in the presence of a nonionic surfactant. The aqueous dispersions thus obtained are also used as sizes.

German Laid-Open Application No. DOS 3,116,797 discloses a stable aqueous polymer dispersion which is obtained by copolymerizing one or more vinyl monomers in an aqueous solution of a derivatized and dilute starch. The starch used has a degree of substitution of not less than 0.05 and an intrinsic viscosity of not less than 0.12 dl/g. The resulting polymer dispersions are used as sizes and coating materials. In the process disclosed in European Patent Application No. 134,449, aqueous polymer dispersions are obtained by polymerizing ethylenically unsaturated compounds in an aqueous medium in the presence of not less than 0.6% by weight, based on the total weight of the monomers, of a water-soluble starch or of a degraded starch, using not less than 30 millimoles of hydrogen peroxide, a ketone peroxide and/or an organic hydroperoxide per kg of the monomers, and a redox catalyst at from 10° to 100° C. The polymer dispersions thus obtained are used for the production of adhesives, as colorants, textile assistants or paper auxiliaries or in hydraulically setting materials. However, the dispersions have only a poor sizing effect for paper.

Japanese Preliminary Published Application No. 58/115 196 discloses a paper auxiliary which increases the strength of paper and at the same time sizes the paper. The paper auxiliary is based on a dispersion of a graft copolymer of styrene with alkyl acrylates on starch. The graft copolymers are obtained by polymerizing styrene and an acrylate, eg. n-butyl acrylate, in an aqueous medium at from 20° to 100° C. with formation of an aqueous dispersion. The sizing effects on paper which are achievable with the aid of these dispersions are still satisfactory.

It is an object of the present invention to provide a paper size which is based on a finely divided aqueous dispersion of a copolymer, the said size being better than the prior art and obtainable by copolymerizing ethylenically unsaturated monomers by emulsion polymerization in the presence of starch.

We have found that this object is achieved, according to the invention, if from 10 to 56 parts by weight of a monomer mixture of (a) from 20 to 65% by weight of acrylonitrile and/or methacrylonitrile.

(b) from 80 to 35% by weight of an acrylate of a monohydric, saturated $C_3C_8$ alcohol and (c) from 0 to 10% by weight of other ethylenically unsaturated copolymerizable monomers, the sum of the percentages of (a), (b) and (c) always being 100, are copolymerized in 100 parts by weight of an aqueous solution of from 1.5 to 25% by weight of a degraded starch having a viscosity $\eta_i$ of from 0.12 to 0.50 dl/g, at from 40° to 100° C. in the presence of a peroxide-containing initiator.

The size dispersions are prepared using acrylonitrile or methacrylonitrile or mixtures of these as monomers of group (a). The monomers of group (a) are used in an amount of from 20 to 65, preferably from 25 to 62, % by weight, based on the sum of all monomers used in the polymerization.

Suitable monomers of group (b) are acrylates which are derived from monohydric, saturated $C_3$-$C_8$-alcohols. Examples of suitable esters of this type are n-propyl acrylate, isopropyl acrylate, n-butyl acrylate, isobutyl acrylate, tert-butyl acrylate, neopentyl acrylate, n-hexyl acrylate, cyclohexyl acrylate and 2-ethylhexyl acrylate. The butyl esters of acrylic acid, in particular n-butyl acrylate and isobutyl acrylate or mixtures of these, and mixtures of n-butyl acrylate and tert-butyl acrylate and mixtures of isobutyl acrylate and tert-butyl acrylate in any ratio are preferably used from group (b). The monomers of group (b) are used in an amount of from 35 to 80, preferably from 38 to 75, % by weight, based on the sum of the monomers used in the copolymerization. The copolymerization may furthermore be carried out in the presence of monomers of group (c), which, if required, are used for modifying the copolymers of (a) and (b). From 0 to 10% by weight of other ethylenically unsaturated copolymerizable monomers which do not fall under the definition of the monomers according to (a) and (b) are used as monomers of group (c). The sum of the percentages of (a), (b) and (c) is always 100. Examples of suitable monomers of group (c) are ethylenically unsaturated $C_3$-$C_5$-carboxylic acids, such as acrylic acid, methacrylic acid, maleic acid, fumaric acid, itaconic acid and maleic acid half esters. This group of monomers also includes vinyl sulfonate and 2-acrylamidopropanesulfonic acid and its alkali metal salts. The ethylenically unsaturated carboxylic acids may be completely neutralized with sodium hydroxide solution, potassium hydroxide solution, ammonia and/or amines, or only partially neutralized, for example from 10 to 80%.

Another possible method of modifying copolymers of the monomers (a) and (b) comprises copolymerizing, as monomers (c), basic compounds, for example di-$C_1$-$C_3$-alkylamino-$C_2$-$C_6$-alkyl acrylates and the corresponding methacrylates, N-vinylimidazoline and/or N-vinyl-2-methylimidazoline. Among the basic acrylates, dimethylaminoethyl methacrylate, dimethylaminoethyl acrylate and diethylaminoethyl acrylate are preferably used. The basic acrylates are employed in the copolymerization in the form of the salts of inorganic acids, such as hydrochloric acid or sulfuric acid, or of organic acids, eg. formic acid, acetic acid or propionic acid, and in quaternized form. Particularly suitable quaternizing agents are methyl chloride, dimethyl sulfate, diethyl sulfate, ethyl chloride and benzyl chloride. As a result of modifying the copolymers of components (a) and (b) with basic acrylates or N-vinylimidazolines, the finely divided copolymer dispersions based on the monomers (a) and (b) and modified in this manner exhibit better absorption on the fibers compared with nonmodified copolymer dispersions.

In another possible method of modification, the monomers (a) and (b) are copolymerized in the presence of nonionic monomers, this group of monomers (c) including styrene, acrylamide, methacrylamide, methacrylates derived from $C_1$-$C_{18}$-alcohols and/or acrylates which differ from the acrylates (b), eg. methyl acrylate, ethyl acrylate, decyl acrylate, palmityl acrylate and/or stearyl acrylate. Among the nonionic monomers of group (c), styrene, acrylamide and methacrylamide are particularly important. Like the monomers of the other groups, the monomers of (c) can be copolymerized alone or as a mixture with one another.

Particularly effective sizes are obtained if a monomer mixture of acrylonitrile and one or more butyl acrylates, preferably from 25 to 62% by weight of acrylonitrile and from 75 to 38% by weight of a butyl acrylate or of a mixture of butyl acrylates, is copolymerized in an aqueous solution of a degraded starch having a viscosity $\eta_i$ of from 0.12 to 0.50 dl/g, in the presence of a peroxide-containing initiator.

The copolymerization of the monomers (a) to (c) is carried out by emulsion polymerization in an aqueous medium in the presence of degraded starches having a viscosity of $\eta_i$ of from 0.12 to 0.50 dl/g. Starches which have this viscosity have already been subjected to oxidative, thermal, acidolytic or enzymatic degradation. Natural starches, such as potato starch, wheat starch, rice starch, tapioca starch or corn starch, may be used for this degradation. Furthermore, chemically modified starches, such as starches containing hydroxyethyl, hydroxypropyl or quaternized aminoalkyl groups, can be degraded to a viscosity $\eta_i$ of from 0.12 to 0.50 dl/g. Oxidatively degraded potato starch, cationic, degraded potato starch or hydroxyethyl starch, in particular those having a viscosity $\eta_i$ of from 0.12 to 0.45 dl/g, are preferably used.

The viscosity $\eta_i$ (also referred to as intrinsic viscosity) of starch is calculated from the relative viscosity $\eta_{rel}$ using the following equation:

$$\eta_i = (2.303 \times Log\ \eta_{rel})/concentration.$$

The concentration is expressed in g/100 ml. The relative viscosity of the degraded starch solutions is determined from the viscosity of the solution at 25° C., using a capillary viscometer, the relative viscosity being calculated from the corrected flow times for the solvent $t_0$ and the solution $t_1$, in accordance with the following equation:

$$\eta_{rel} = t_1/t_0.$$

$\eta_i$ is obtained according to the abovementioned relationship, as described in Methods in Carbohydrate Chemistry, Volume IV, Starch, Academic Press, New York and London, 1964, page 127.

To prepare the finely divided copolymer dispersions, an aqueous solution of from 1.5 to 25, preferably from 1.7 to 21, % by weight of a degraded starch having a viscosity $\eta_i$ of from 0.12 to 0.50 dl/g is first prepared. Degraded starches having a viscosity of from 0.3 to 0.5 dl/g are preferably used when it is intended to prepare dispersions having a low solids content. The degraded starches having a low viscosity, ie. from 0.12 to about 0.3 dl/g, are preferably used for the preparation of dispersions having higher solids contents, eg. from 25 to 40% by weight. Mixtures of starches of different viscosities $\eta_i$ can also be used as protective colloids, but the viscosity of the mixture must be in the stated $\eta_i$ range of from 0.12 to 0.50 dl/g, ie. it is also possible in this case to use starches whose viscosity is outside the stated range. From 10 to 56 parts by weight of a monomer mixture of components (a) to (c) are subjected to the copolymerization per 100 parts by weight of an aqueous starch solution of this type. The monomers can be emulsified in the aqueous solution of the degraded starch either in the form of a mixture or separately from one another. In order to stabilize the emulsion, a small amount of an emulsifier can be added to the aqueous starch solution. However, it is also possible for the monomers first to be emulsified in water with the aid of an emulsifier and then to be added in the form of the emulsion to the aqueous starch solution. Suitable emulsifiers for this purpose are anionic or cationic products. Examples of such emulsifiers are sodium alkylsulfonates, sodium laurylsulfate, sodium dodecylbenzenesulfonate and dimethylalkylbenzylammonium chlorides. It is advisable to use anionic emulsifiers for anionic starches and cationic emulsifiers for cationic starches. The amount of emulsifiers which may be concomitantly used is from 0 to 0.3, preferably from 0.05 to 0.2, % by weight, based on the sum of the monomers (a) to (c) used. However, the emulsion polymerization is preferably carried out in the absence of an emulsifier because, as a rule, emulsifiers have an adverse effect on the sizing process and frequently give rise to pronounced development of foam during handling and use of the sizes.

The copolymerization of the monomers in the aqueous solution of the degraded starch is carried out at from 40 to 110° C., preferably from 50° to 100° C., in the presence of a peroxide-containing initiator. Suitable polymerization initiators are primarily hydrogen peroxide, combinations of hydrogen peroxide with a heavy metal salt, eg. iron(II) sulfate, and a redox system consisting of hydrogen peroxide and a suitable reducing agent, such as sodium formaldehyde sulfoxylate, ascorbic acid, sodium bisulfite and/or sodium dithionite. A redox system consisting of hydrogen peroxide, a reducing agent or a mixture of the stated reducing agents and furthermore a small amount of a heavy metal salt, eg. iron(II) sulfate, is preferably used. Examples of other suitable peroxide-containing initiators are organic peroxides, hydroperoxides and peroxydisulfates. Examples of suitable compounds of this type are tert-butyl hydroperoxide, acetylcyclohexylsulfonyl peroxide, sodium peroxydisulfate, potassium peroxydisulfate and ammonium peroxydisulfate.

During the polymerization, thorough mixing of the components should be ensured. Thus, the reaction mixture is preferably stirred for the entire duration of the polymerization and any subsequent polymerization, in order to reduce the residual monomer content. Polymerization is carried out in the absence of oxygen, in an inert gas atmosphere, for example under nitrogen. In order to initiate the polymerization, the oxygen is first removed from the aqueous solution of the starch and from the monomers, and from 1 to 40% of the monomers to be polymerized are initially added to the aqueous solution of the starch, and the monomers are emulsified therein by stirring the reaction mixture. The polymerization begins (as a rule after a short induction period) as a result of prior, simultaneous or subsequent addition of an aqueous initiator solution. The heat of polymerization generated at the beginning of the polymerization can be used to heat the reaction mixture. The temperature may increase to 90° C. during the process. As soon as the initially taken monomers have polymerized, the remainder of the monomers and the initiator solution are added continuously or a little at a time and polymerized with stirring. However, the copolymerization can also be carried out batchwise or continuously. In the resulting finely divided aqueous dispersion, the copolymer particles are surrounded by a protective colloid shell based on a degraded starch. A measure of the fineness of dispersion is the LT value (Light transmittance of the dispersion). The LT value is determined by measuring the dispersion in 0.01% strength by weight aqueous solution in a cell of edge length 2.5 cm using light having a wavelength of 546 nm, and is compared with the transmittance of water under the above-mentioned conditions. The transmittance of water is set at 100%. The more finely divided the dispersion, the higher is the LT value measured by the method described above.

The mean particle size of the copolymer particles without the protective colloid shell of degraded starch can be determined if the starch shell of the latex particles is virtually completely enzymatically degraded. Possible coagulation of the copolymer dispersion can be prevented by adding a suitable emulsifier. After the enzymatic degradation, the particle size of the copolymer dispersion can be measured using a commercial apparatus, for example the Nanosizer from Coulter Electronics. The means diameter of the copolymer particles without the protective colloid shell is from 75 to 110 nm.

The finely divided aqueous copolymer dispersions described above are used as engine sizes and surface sizes for paper. In the surface sizing of paper, water is added to bring the copolymer dispersion to a total polymer concentration generally used for preparation solutions for sizing paper, for example to a polymer content of from 0.05 to 3.0% by weight. The amount of copolymer which is applied to the paper for sizing purposes is as a rule from 0.02 to 1.5, preferably from 0.3 to 0.8, % by weight, based on dry fiber. To produce the preparation solutions, the dispersions, whose solids content is from 15 to 40% by weight, are diluted with water. The preparation solutions may also contain other auxiliaries, for example natural starch for increasing the strength of the paper, wet strength and dry strength agents based on synthetic products, colorants and wax emulsions.

The preparation solutions are generally applied to the surface of the paper with the aid of a size press. It is of course also possible to apply the preparation solution to the paper webs by spraying or immersion or, for example, with the aid of a water doctor. The paper treated with the preparation solution is then dried at elevated temperatures. The sizing effect is already fully developed after the paper web has been dried.

In the Examples, parts and percentages are by weight. The degree of sizing of the papers was determined with the aid of the Cobb value according to DIN 53,132. To test the sizing effect of the copolymer dispersions, two different test papers were used. They had the following compositions:

Test paper A

50% of bleached sulfide pulp and
50% of bleached sulfate pulp, and
30%, based on dry pump, of chalk. The paper was made at pH 7.

Test paper B

50% of bleached sulfite pulp and
50% bleached sulfite pulp, and
25%, based on dry pump, of china clay and
2%, based on dry paper, of allum.

Neither of the test papers were engine sized, and both had a basis weight of 70 g/m$^2$. The freeness was 25° SR (Schopper-Riegler) and the ash content was 14%. Unless stated otherwise, the preparation solutions each contained 2.5 g/l of the copolymer, based on the solids content of the dispersions, and 60 g/l of an oxidatively degraded starch having an $\eta_i$ of 0.36 dl/g. The liquor pickup in each case was 90%, based on dry paper.

The mean particle size of the copolymer dispersion was measured using a Nanosizer from Coulter Electronics, after virtually complete enzymatic degradation of the protective colloid shell. For this purpose, 10 ml of the dispersion were diluted with 30 ml of water. Thereafter, 0.03 g of citric acid and 0.2 g of the sodium salt of the sulfuric acid half ester of the reaction product of 1 mole of isooctylphenol with 25 moles of ethylene oxide were added to 1 ml of the resulting aqueous solution. The pH was brought to 5.0 by adding dilute ammonia solution, after which 3 ml of a 1% strength aqueous, commercial enzyme solution ($\alpha$-amylase B) were added and the mixture was heated at 55° C. for one hour. The sample was then diluted with water to a concentration of about 0.001% by weight. The particle diameter was then determined in the Nanosizer.

| Characterization of the starches and enzymes used $\eta_i$ dl/g Degree of substitution, mol/mol of glucose units | | |
| --- | --- | --- |
| Starch I: Oxidatively degraded potato starch | 0.34 | 0.04 —COOH |
| Starch II: Oxidatively degraded potato starch | 0.28 | 0.034 —COOH |
| Starch III: Degraded, cationic potato starch | 0.47 | 0.015 —COOH 0.027 N |
| Starch IV: Degraded hydroxyethyl potato starch | 0.47 | 0.015 —COOH 0.07 hydroxyethyl groups |
| Starch V: Cationic potato starch | 1.6 | 0.09 N |

$\alpha$-Amylase A $\alpha$-Amylase A is an $\alpha$-amylase capable of withstanding higher temperatures. When 16.7 mg of 100% pure $\alpha$-amylase A are used, 5.26 g of Amylum Solubile starch from Merck can be degraded in the course of from 7 to 20 minutes at 37° C. and a pH of 5.6 and with a calcium content of the solution of 0.0043 mole/liter. $\alpha$-Amylase A has maximum activity at 90° C. and pH 6.5.

$\alpha$-Amylase B has maximum activity at 55° C. and a pH of 5.0. When 1.25 mg of 100% pure $\alpha$-amylase B are used, 5.26 g of Amylum Solubile starch from Merck can be degraded in the source of from 7 to 20 minutes at 37° C. and a pH of 4.7.

Abbreviations used:

AN: acrylonitrile
BA: n-butyl acrylate
tBA: tert-butyl acrylate
iBA: isobutyl acrylate
DMAEMA: dimethylaminoethyl methacrylate
NFS: sodium formaldehyde sulfoxylate

EXAMPLE 1

31.8 g of starch I and 219 g of water are initially taken in a 1 l four-necked flask equipped with a stirrer, a reflux condenser, metering apparatuses and an apparatus for working under a nitrogen atmosphere, and are heated at 85° C. for 30 minutes, while stirring. 1 g of a 1% strength aqueous calcium acetate solution and 1.6 g of a 1% strength commercial enzyme solution (α-amylase A) are then added. After 20 minutes, the enzymatic starch degradation is stopped by adding 4 g of glacial acetic acid. The intrinsic viscosity of the starch after this treatment is 0.21 dl/g. 7 g of a 1% strength aqueous iron(II) sulfate solution and 0.34 g of a 30% strength hydrogen peroxide are also added. The temperature of the reaction mixture is kept at 85° C. At this temperature, a mixture of 40 g of acrylonitrile and 33.5 g of n-butyl acrylate are then added in the course of one hour and, separately from this and likewise in the course of one hour, 61 ml of a 0.7% strength hydrogen peroxide solution are introduced. After the total amount of monomers have been metered in, polymerization is continued for a further hour at 85° C. A dispersion having a solids content of 26.3% and an LT value of 96% is obtained.

A preparation solution is prepared by diluting the polymer solution with water to a copolymer content of 2.5 g/l, and the test papers A and B described above are sized. Test paper A has a Cobb value of 22 and test paper B a Cobb value of 34.

EXAMPLE 2

31.8 g of starch I and 260 g of water are initially taken in a 1 l four-necked flask equipped with a stirrer, a reflux condenser, two dropping funnels and an apparatus for working under nitrogen, and are heated at 85° C. for 30 minutes, while stirring. Thereafter, 1 g of a 1% strength calcium acetate solution and 1.6 g of a 1% strength commercial enzyme solution (α-amylase A) are added, and the reaction mixture is heated at 85° C. for 20 minutes. The intrinsic viscosity of the digested starch is then 0.20 dl/g. 7 g of a 1% strength aqueous iron(II) sulfate solution and 0.34 g of 30% strength hydrogen peroxide are then added all at once to this digested starch, after which a monomer mixture consisting of 33 g of acrylonitrile, 18.3 g of n-butyl acrylate, 18.3 g of tert-butyl acrylate and 3.5 g of styrene is added continuously in the course of 1.5 hours. From the second dropping funnel, a mixture of 1.4 g of 30% strength hydrogen peroxide in 50 ml of water is added continuously, and simultaneously with the monomer solution. When the addition of the monomer and initiator is complete, the reaction mixture is kept at 85° C. for a further hour. A finely divided aqueous dispersion having a solids content of 22.6% results. The LT value is 97%, and the particle diameter of the dispersion after enzymatic degradation is 78 nm.

The resulting aqueous polymer dispersion is used to produce a preparation solution by bringing the solids content to 2.5 g/l by dilution with water. This preparation solution is used for sizing test papers A and B mentioned above. The sized test paper A has a Cobb value of 24.5 and the sized test paper B a Cobb value of 19.

EXAMPLE 3

41.7 g of starch I and 228 g of water are initially taken in the apparatus described in Example 2 and are heated at 85° C. for 30 minutes, while stirring. Thereafter, 2.5 g of a 1% strength commercial enzyme solution (α-amylase A) and 1 g of a 1% strength aqueous calcium acetate solution are added. Degradation of the starch is stopped after 20 minutes by adding 4 g of glacial acetic acid. The intrinsic viscosity of the oxidatively degraded potato starch used is then 0.22 dl/g. 3 g of a 1% strength iron(II) salt solution and 0.34 g of 30% strength hydrogen peroxide are then added all at once, after which, at a temperature of the reaction mixture of 85° C., the continuous addition of a monomer mixture of 28 g of acrylonitrile, 20.2 g of n-butyl acrylate and 19.2 g of tert-butyl acrylate and the continuous addition of the initiator solution consisting of 1.3 g of 30% strength hydrogen peroxide in 50 ml of water are begun. The simultaneous addition of the monomers and initiator is complete after 1.5 hours. The reaction mixture is then kept at 85° C. for a further hour. A finely divided aqueous copolymer dispersion having a solids content of 28.7% and an LT value of 96% results. The particle diameter of the copolymer particles after enzymatic degradation is 63 nm.

The copolymer dispersion is diluted to a solids content of 2.5 g/l by adding water and is used for sizing test papers A and B. The sized test paper A has a Cobb value of 22 and the sized test paper B a Cobb value of 23.

EXAMPLE 4

41.3 g of starch I and 222 g of water are initially taken in the apparatus described in Example 2 and stirred for 60 minutes at 85° C. Thereafter, 0.12 g of calcium acetate and 2.5 g of a 1% strength commercial enzyme solution (α-amylase A) are then added, and the reaction mixture is stirred for 20 minutes at 85° C. The enzymatic degradation is stopped by adding 5 g of glacial acetic acid. After this treatment, the starch has a viscosity $\eta_i$ of 0.23 dl/g. 3 g of a 1% strength aqueous iron(II) sulfate solution and 1.3 g of 30% strength hydrogen peroxide are then added. Directly after the addition of the hydrogen peroxide, an emulsion having the following composition is introduced continuously in the course of 1.5 hours, as feed 1:

36 g of acrylonitrile,
24 g of n-butyl acrylate,
9 g of isobutyl acrylate,
1 g of sodium formaldehyde sulfoxylate and
10 g of water.

Simultaneously with beginning feed 1, a feed 2, which consists of a solution of 1.3 g of 30% strength hydrogen peroxide in 50 g of water, is metered into the reaction mixture. Feeds 1 and 2 are metered into the reaction mixture in the course of 1.5 hours. The polymerization is carried out at 85° C. When the addition of the initiator and monomers is complete, the reaction mixture is polymerized for a further hour. A dispersion having a solids content of 25.6% and an LT value of 95% is obtained. The particle diameter of the polymer after the enzymatic degradation is 90 nm.

A preparation solution having a solids content of 2.5 g/l is produced by dilution with water and used as a size for the test papers A and B described above. The sized test paper A has a Cobb value of 23 and the sized test paper B a Cobb value of 22.

EXAMPLES 5 to 18

The starch I stated in Example 4 is digested enzymatically with the α-amylase A likewise described in Example 4, in the manner and under the conditions described there and in accordance with the data shown in Table 1. Table 1 states the intrinsic viscosities of each of the enzymatically digested starches produced, as well as the amounts of iron-(II) sulfate solution and hydrogen peroxide.

TABLE 1

| | | | | Initially taken amounts in g in each case | | |
|---|---|---|---|---|---|---|
| Example | Water | Starch I 82% strength | Amylase 1% strength | $\eta_i$ of the enzymatically digested starch | Fe salt 1% strength | $H_2O_2$ 30% strength |
| 4 | 225 | 41.3 | 2.5 | 0.23 | 3 | 1.3 |
| 5 | 225 | 41.3 | 2.5 | 0.21 | 3 | 1.3 |
| 6 | 225 | 41.3 | 2.5 | 0.24 | 3 | 1.3 |
| 7 | 225 | 41.3 | 2.5 | 0.20 | 3 | 1.3 |
| 8 | 225 | 41.5 | 1.9 | 0.25 | 3 | 1.3 |
| 9 | 225 | 41.5 | 1.9 | 0.24 | 3 | 1.3 |
| 10 | 225 | 41.5 | 2.5 | 0.23 | 3 | 1.3 |
| 11 | 225 | 41.5 | 2.5 | 0.23 | 3 | 1.3 |
| 12 | 225 | 41.5 | 2.5 | 0.21 | 3 | 1.3 |
| 13 | 225 | 41.5 | 2.5 | 0.22 | 3 | 1.3 |
| 14 | 175 | 41.5 | 3 | 0.19 | 3 | 1.3 |
| 15 | 175 | 41.5 | 2.5 | 0.22 | 6 | 1.3 |
| 16 | 143 | 36.6[(1)] | | 0.28 | 4 | 0.5 |
| 17 | 225 | 41.3 | 2.5 | 0.23 | 3 | 1.3 |
| 18 | 225 | 41.3 | 2.5 | 0.21 | 3 | 1.3 |

[(1)]Starch II was used instead of starch I

An emulsion consisting of the components shown in Table 2 is then added as feed 1, simultaneously with a feed 2 which consists of a mixture of 1.3 g of 30% strength hydrogen peroxide in 50 g of water. The duration of feeds 1 and 1 is in each case identical and is shown in Table 2. In each case, a finely divided aqueous dispersion is obtained, the solids content and LT value of the dispersion and the diameter of the polymer particles after enzymatic degradation being shown in Table 2. Table 2 also gives the Cobb values for the test papers A and B sized with an aqueous preparation solution having a solids content of 2.5 g/l.

EXAMPLES 19 TO 23

In a 1 l flask provided with a stirrer, a reflux condenser and two dropping funnels, 40.2 g of starch I are suspended in 300 ml of water in a nitrogen atmosphere and heated at 85° C. for 20 minutes. Thereafter, 2.3 g of a 1% strength commercial enzyme solution ($\alpha$-amylase A) are added, and the potato starch, which has already been digested, is degraded for 20 minutes at 85° C. until it has the intrinsic viscosities shown in Table 3. The enzyme is then deactivated by adding 4 ml of glacial acetic acid and 2.7 g of 1% strength aqueous iron(II) sulfate solution. The amount of 305 strength hydrogen peroxide stated in each case in Table 3 and 36% of the monomer feed likewise stated in Table 3 are added to the initially taken mixture. The monomer feed consists of an emulsion obtained by emulsifying the monomers stated in Table 3 in 27 g of water in each case, using 0.07 g of a commercial emulsifier based on sodium $C_{14}$-alkyl sulfonate. The amounts of sodium formaldehyde sulfoxylate stated in Table 3, dissolved in each case in 14 ml of water, are then added to the mixture in the course of 10 minutes. The remainder of the monomer emulsion is then metered in over the period stated in Table 3, simultaneously with an initiator feed consisting of 0.94 g of 30% strength hydrogen peroxide in 42 g of water. A finely divided dispersion, whose solids content, LT value and polymer particle diameter (after removal of the starch shell) are stated in Table 3, is obtained.

Test papers A and B are sized with dispersion having a solids content of 2.5 g/l and obtained by diluting the dispersions described in Examples 19 to 24. The sizing values for test papers A and B are likewise shown in Table 3.

TABLE 2

| Example No. | Feed 1: emulsion of | | | | | | Feed duration h | Solids content % | LT value % | Diameter of polymer particles nm | Sizing Cobb value for test paper | |
|---|---|---|---|---|---|---|---|---|---|---|---|---|
| | NFS | $H_2O$ | AN | BA | tBA | iBA | | | | | A | B |
| 4 | 1 | 10 | 36 | 24 | | 8 | 1.5 | 25.6 | 95 | 90 | 23 | 22 |
| 5 | 1 | 10 | 37 | 30 | | | 1.5 | 26.6 | 94 | 84 | 25 | 17 |
| 6 | 1 | 10 | 28 | 20 | 19 | | 1.5 | 25.9 | 96 | 100 | 22 | 20 |
| 7 | 1 | 10 | 34 | 6 | 27 | | 1.5 | 26.8 | 94 | 110 | 29 | 23 |
| 8 | 1 | 10 | 34 | 17 | | 16 | 1.5 | 28.4 | 96 | 96 | 19 | 22 |
| 9 | 1 | 10 | 36 | 24 | | 8 | 1.5 | 29.2 | 95 | 99 | 21 | 27 |
| 10 | 1 | 10 | 30 | 27 | | 10 | 1 | 24.6 | 97 | 87 | 21 | 27 |
| 11 | 1 | 10 | 30 | 27 | 10 | | 3 | 19.7 | 96 | 87 | 24 | 33 |
| 12 | 1 | 10 | 20 | 30 | 17 | | 3 | 22.0 | 97 | 96 | 22 | 53 |
| 13 | 1 | 10 | 30 | 27 | 10 | | 1.5 | 23 | 97 | 86 | 23 | 37 |
| 14 | 1 | 10 | 30 | 27 | 10 | | 1.5 | 22.3 | 94 | 103 | 21 | 27 |
| 15 | 1.5[(1)] | 10 | 30 | 27 | 10 | | 1.5 | 22.2 | 96 | 93 | 22 | 35 |
| 16 | 0.5[(1)] | 175 | 35 | 18 | 18 | | 2.3 | 20.0 | 95 | 81 | 25 | 20 |
| 17 | 1 | 10 | 33 | 13 | 20 | | 3 | 21.6 | 97 | 82 | 21 | 33 |
| 18 | 1 | 10 | 23 | 27 | 17 | | 3 | 24.0 | 96 | 89 | 25 | 52 |

[(1)]0.1 g of sodium alkylsulfonate emulsifier in addition

TABLE 3

| Example no. | Water | Starch 82% strength | Amylase 1% strength | $\eta_i$ of the starch after enzym. digestion | Fe salt 1% strength | $H_2O_2$ 30% strength | NFS | ...parts of monomers AN BA tBA emulsified in 27 parts of $H_2O$ | | | Feed duration h | Solids content % | LT value % | Diameter of the polymer particles nm | Sizing Cobb value for test paper A | B |
|---|---|---|---|---|---|---|---|---|---|---|---|---|---|---|---|---|
| 19 | 300 | 40.2 | 2.3 | 0.21 | 2.7 | 2.0 | 0.72 | 30 | 27 | 10 | 1 | 19.6 | 95 | 106 | 24 | 21 |
| 20 | 299 | 48.8 | 2.9 | 0.20 | 2.7 | 2 | 0.72 | 30 | 27 | 10 | 0.5 | 19.7 | 97 | 88 | 22 | 23 |
| 21 | 307 | 36.6 | 2.3 | 0.23 | 2.7 | 1.4 | 0.5 | 32 | 28 | 11 | 1.3 | 19.6 | 95 | 99 | 22 | 27 |
| 22 | 307 | 48.8 | 2.9 | 0.23 | 2.7 | 1.4 | 0.5 | 27 | 24 | 9 | 1.3 | 20.3 | 96 | 95 | 22 | 31 |
| 23 | 308 | 40 | 2.3 | 0.19 | 2.7 | 1.3 | 0.5 | 37 | 30 | | 1.5 | 18.9 | 96 | 88 | 31 | 26 |

EXAMPLE 24

73 g of starch IV in 470 g of water are digested at 90° C. in the apparatus described in Example 2. The mixture is cooled to 85° C., after which 4 g of a 1% strength α-amylase A was added. After 20 minutes, the enzyme is deactivated by adding 10 g of glacial acetic acid and 6 g of a 1% strength iron sulfate solution ($\eta_i = 0.16$ dl/g). 1 g of 30% strength hydrogen peroxide is then added, and directly thereafter a mixture of 63 g of acrylonitrile, 56 g of n-butyl acrylate and 21 g tert-butyl acrylate is metered in over 2 hours, simultaneously with a solution of 4 g of 30% strength hydrogen peroxide in 97.5 g of water. Polymerization is continued for one hour to give a dispersion having a solids content of 25.7% and an LT value of 90.

EXAMPLE 25

73 g of starch I in 470 g of water are digested at 90° C. in the apparatus described in Example 2. The mixture is cooled to 85° C., after which 4 g of a 1% strength α-amylase A are added. After 20 minutes, the enzyme is deactivated by adding 10 g of glacial acetic acid and 6 g of a 1% strength iron sulfate solution ($\eta_i$-0.15 dl/g). 1 g of 30% strength hydrogen peroxide is then added, and directly thereafter metering of a mixture of 63 g of acrylonitrile, 56 g of n-butyl acrylate, 21 g of tert-butyl acrylate and 2.8 g of acrylic acid and, simultaneously, a solution of 4 g of 30% strength hydrogen peroxide in 97.5 g of water is begun, the said metering procedure being carried out in the course of 2 hours. Polymerization is continued for one hour to give a dispersion having a solids content of 25.8% and an LT value of 93.

EXAMPLE 26

61 g of starch III in 470 g of water are digested at 90° C. in the apparatus described in Example 2. The mixture is cooled to 85° C., after which 4 g of a 1% strength α-amylase A are added. After 20 minutes, the enzyme is deactivated by adding 10 g of glacial acetic acid and 6 g of a 1% strength iron sulfate solution ($\eta_i$ - 0.17 dl/g). 1 g of 30% strength hydrogen peroxide is then added, and directly thereafter a mixture of 67.5 g of acrylonitrile, 60 g of n-butyl acrylate and 22.5 g of tert-butyl acrylate is metered in over 3 hours, simultaneously with a solution of 4 g of 30% strength hydrogen peroxide in 97.5 g of water. Polymerization is continued for one hour to give a dispersion having a solids content of 24.0% and an LT value of 91.

EXAMPLE 27

24 g of starch III in 345 g of water are digested at 90° C. in the apparatus described in Example 2. The mixture is cooled to 55° C., after which 0.6 g of a 1% strength α-amylase B is added. After 30 minutes, the enzyme is deactivated by adding 10 g of glacial acetic acid and 6 g of a 1% strength iron sulfate solution ($\eta_i = 0.35$ dl/g). 2.5 g of 30% strength hydrogen peroxide are then added, and directly thereafter metering of a mixture of 45 g of acrylonitrile, 40 g of n-butyl acrylate, 15 g of tertbutyl acrylate, 2 g of sodium formaldehyde sulfoxylate and 20 g of water and, simultaneously, a solution of 2.5 g of 30% strength hydrogen peroxide in 97.5 g of water is begun, the said metering procedure being carried out in the course of 3 hours. Polymerization is continued for one hour to give a dispersion having a solids content of 19.8% and an LT value of 88.

EXAMPLE 28

24 g of starch III in 345 g of water are digested at 90° C. in the apparatus described in Example 2. The mixture is cooled to 55° C., after which 0.6 g of a 1% strength α-amylase B is added. After 30 minutes, the enzyme is deactivated by adding 10 g of glacial acetic acid and 6 g of a 1% strength iron sulfate solution ($\eta_i = 0.34$ dl/g). 2.5 g of 30% strength hydrogen peroxide are then added, and directly thereafter metering of a mixture of 45 g of acrylonitrile, 40 g of n-butyl acrylate, 15 g of tert-butyl acrylate, 2 g of sodium formaldehyde sulfoxylate, 20 g of water and 5 g of vinylimidazole quaternized with dimethyl sulfate and, simultaneously, a solution of 2.5 g of 30% strength hydrogen peroxide in 97.5 g of water is begun, the said metering procedure being carried out in the course of 3 hours. Polymerization is continued for one hour to give a dispersion having a solids content of 20.0% and an LT value of 90.

EXAMPLE 29

24 g of starch III in 345 g of water are digested at 90° C. in the apparatus described in Example 2. The mixture is cooled to 55° C., after which 0.6 g of a 1% strength α-amylase B is added. After 30 minutes, the enzyme is deactivated by adding 10 g of glacial acetic acid and 6 g of a 1% strength iron sulfate solution ($\eta_i = 0.36$ dl/g). 2.5 g of 30% strength hydrogen peroxide are then added, and directly thereafter metering of a mixture of 45 g of acrylonitrile, 40 g of n-butyl acrylate, 15 g of tert-butyl acrylate, 2 g of sodium formaldehyde sulfoxylate, 20 g of water and 2.5 g of diethylaminoethyl acrylate and, simultaneously, a solution of 2.5 g of 30% strength hydrogen peroxide in 97.5 g of water is begun, the said metering procedure being carried out in the course of 3 hours. Polymerization is continued for one hour to give a dispersion having a solids content of 19.0% and an LT value of 95.

EXAMPLE 30

24 g of starch III in 345 g of water are digested at 90° C. in the apparatus described in Example 2. The mixture is cooled to 55° C., after which 0.6 g of a 1% strength α-amylase B is added. After 30 minutes, the enzyme is deactivated by adding 10 g of glacial acetic acid and 6 g of a 1% strength iron sulfate solution ($\eta_i = 0.35$ dl/g). 2.5 g of 30% strength hydrogen peroxide are then added, and directly thereafter metering of a mixture of 45 g of acrylonitrile, 40 g of n-butyl acrylate, 15 g of tert-butyl acrylate, 2 g of sodium formaldehyde sulfoxylate, 20 g of water and 2.5 g of dimethylaminoethyl methacrylate and, simultaneously, a solution of 2.5 g of 30% strength hydrogen peroxide in 97.5 g of water is begun, the said metering procedure being carried out in the course of 3 hours. Polymerization is continued for one hour to give a dispersion having a solids content of 20.0% and an LT value of 87.

EXAMPLE 31

24 g of starch III in 345 g of water are digested at 90° C. in the apparatus described in Example 2. The mixture is cooled to 55° C., after which 0.6 g of a 1% strength α-amylase B is added. After 30 minutes, the enzyme is deactivated by adding 10 g of glacial acetic acid and 6 g of a 1% strength iron sulfate solution ($\eta_i = 0.33$ dl/g). 2.5 g of 30% strength hydrogen peroxide are then added, and directly thereafter metering of a mixture of 45 g of acrylonitrile, 40 g of n-butyl acrylate, 15 g of tert-butyl acrylate, 2 g of sodium formaldehyde sulfoxylate, 20 g of water, 2.5 g of dimethylaminoethyl methacrylate and 1 g of acrylic acid and, simultaneously, a solution of 2.5 of 30% strength hydrogen peroxide in 97.5 g of water is begun, the said metering procedure being carried out in the course of 3 hours. Polymerization is continued for one hour to give a dispersion having a solids content of 20.3% and an LT value of 87.

EXAMPLE 32

33 g of starch III and 3 g of starch V in 260 g of water are digested at 85° C. in the apparatus described in Example 1. 0.37 g of calcium acetate and 3.75 g of 1% strength α-amylase A are then added. After 20 minutes, the enzyme is deactivated by adding 7.5 g of glacial acetic acid and 3.75 g of 1% strength iron sulfate solution. The starch mixture then has a $\eta_i$ value of 0.31 dl/g. 1.0 g of 30% strength hydrogen peroxide is added, followed by 25% of the monomer mixture which consists of 31.6 g of acrylonitrile, 28.0 g of n-butyl acrylate and 10.4 g of tert-butyl acrylate. A solution of 0.5 g of sodium formaldehyde sulfoxylate in 20 g of water is then metered in over 10 minutes. Thereafter, the remainder of the monomers and, simultaneously, a solution of 0.24 g of hydrogen peroxide in 30 go of water are pumped in over 2 hours. Polymerization is then continued for a further hour. A dispersion having a solids content of 23.4% and an LT value of 93% is obtained.

TABLE 4

Surface sizing of papers A and B with the sizes prepared as described in Examples 24 to 32

| Example | Test paper A Cobb value | Test paper B Cobb value |
| --- | --- | --- |
| 24 | 23 | 37 |
| 25 | 20 | 75 |
| 26 | 19 | 23 |
| 27 | 22 | 24 |
| 28 | 21 | 22 |
| 29 | 18 | 23 |
| 30 | 21 | 23 |
| 31 | 18 | 23 |
| 32 | 20 | 25 |

Dispersions prepared using cationic starch can be used as engine sizes for paper. The size is added before sheet formation. Two different grades of paper are tested. The starting materials for making papers C and D have the following composition:

Paper C: 100% of sulfite pulp, 30% of CaCO$_3$ and 0.3%, based on dry paper, of a copolymer of acrylamide and acrylic acid; 12% of ash (as CaCO$_3$).

Paper D: 50% of wastepaper and 50% of corrugated board; 80 g/m$^2$; no additional allum.

TABLE 5

Use of the dispersions according to Examples 26 to 32 as engine sizes for paper

| Example | Concentration % | Paper C Cobb value | Paper D Cobb value |
| --- | --- | --- | --- |
| 26 | 1 | 37 | 66 |
|    | 1.5 | 26 | 30 |
| 27 | 1 | 37 | 130 |
|    | 1.5 | 29 | 54 |
| 28 | 1 | 30 | 23 |
|    | 1.5 | 23 | 18 |
| 29 | 1 | 32 | 22 |
|    | 1.5 | 28 | 18 |
| 30 | 1 | 28 | 19 |
|    | 1.5 | 22 | 18 |
| 31 | 1 | 35 | 36 |
|    | 1.5 | 28 | 22 |
| 32 | 1 | 28 | 30 |
|    | 1.5 | 22 | 30 |

COMPARATIVE EXAMPLE 1

45.7 g of starch I in 422 g of water are digested at 85° C. as described in Example 3 of U.S. Pat. No. 3,061,471. 0.16 g of calcium acetate are added, followed by 2.3 g of a 1% strength enzyme solution (α-amylase A). After 30 minutes, $\eta_i$ is 0.28 dl/g. Thereafter, 1 g of glacial acetic acid and 0.05 g of iron(II) ammonium sulfate solution are added and the temperature of the reaction mixture is reduced to 50° C. 45.2 of ethyl acrylate, 0.2 g of ascorbic acid and 0.67 g of 30% strength hydrogen peroxide are then added. The temperature of the reaction mixture increases rapidly to 75° C. and is kept at this value for 1.1 hours. The resulting dispersion has a solids content of 16.6% and an LT value of 99.

The dispersion prepared in this manner is diluted to a solids content of 2.5 g/l and then used in this form for sizing the test papers A and B described above. Test paper A has a Cobb value of 81, while test paper B has a Cobb value of 86.

COMPARATIVE EXAMPLE 2

67.5 g of starch II in 270 ml of water are digested as described in Example 7 of U.S. Pat. No. 3,061,472, and the aqueous solution is diluted with 487 g of water and brought to 50° C. ($\eta_i$=0.28 dl/g). 1 ml of glacial acetic acid, 0.3 g of iron(II) ammonium sulfate, 6.6 g of a commercial emulsifier (alkylphenoxy ether of polyoxyethylene containing on average 10 oxyethylene groups), 67.5 g of tert-butyl acrylate and 1.5 g of 30% strength hydrogen peroxide are added. Polymerization is carried out at 60° C. and the reaction mixture is cooled after 2 hours. A dispersion having a solids content of 15.1% and an LT value of 85% is obtained. The diameter of the polymer particles is 177 nm. The test papers A and B mentioned above are each sized with a dispersion having a solids content of 2.5 g/l. The Cobb value of test paper A is 76 and that of test paper B is 89.

COMPARATIVE EXAMPLE 3

182 g of an 82% strength starch IV are suspended in 260 g of water in a polymerization vessel and digested by heating at 85° C., as described in Example 3 of German Laid-Open Application No. DOS 3,116,797. The starch solution is then degraded with 0.1 g of a commercial enzyme (α-amylase Termamyl 60 L) to a $\eta_i$ value of 0.24 dl/g. 5 g of glacial acetic acid are then added, followed by 5 g of 30% strength hydrogen peroxide. 20 g of a monomer mixture consisting of 54 g of styrene and 6 g of acrylonitrile are introduced, and the polymerization is allowed to begin before the remainder of the monomer mixture is added. The polymerization is carried out at 90° C. and is complete after 2.5 hours. The dispersion has a solids content of 41.6% and an LT value of 57.

The dispersion is diluted to a solids content of 2.5 g/l and used for sizing test papers A and B. The Cobb value of both papers after sizing is greater than 150.

COMPARATIVE EXAMPLE 4

8 g of dextrin are dissolved in 55 g of water at 70° C. as described in Example 6 of European Patent Application No. 134,449. The pH is brought to 2.7 by adding glacial acetic acid, and 1.1 g of 80% strength tert-butyl hydroperoxide are added. A mixture of 40 g of styrene and 60 g of n-butyl acrylate and, simultaneously, a solution of 0.6 g of sodium formaldehyde sulfoxylate and 0.6 g of sodium sulfite in 50 g of water are then metered in over 2 hours. When the addition is complete, the reaction mixture is polymerized for a further hour at 70° C. A dispersion having a solids content of 51.6% and an LT value of 56% is obtained. The mean diameter of the dispersed polymer particles is 179 nm.

The polymer dispersion obtained in this manner is diluted to a solids content of 2.5 g/l and used to size test papers A and B. In the test to determine the Cobb value of the sized test papers, it is found that test paper A has a Cobb value of 80 and test paper B a value of 85.

COMPARATIVE EXAMPLE 5

18.5 g of starch II are suspended in 400 ml of water and heated at 90° C. for 40 minutes in a 2 l flask provided with a stirrer and a reflux condenser, the procedure being carried out as described in Example 1 of Japanese Preliminary Published Application No. 58/115 196. The digested starch is cooled to 30° C., after which a mixture of 58 g of styrene and 43.5 g of n-butyl acrylate and, as an initiator, a solution of 1 g of potassium peroxydisulfate in 50 ml of water are added. The stirred reaction mixture is heated to 80° C. and kept at this temperature for 3 hours. Polymerization is then completed in the course of a further 3 hours at 90° C., after which the mixture is cooled. A dispersion having a solids content of 20.6% and an LT value of 84 is obtained. The diameter of the polymer particles is 101 nm.

The dispersion obtained in this manner is diluted to a solids content of 2.5 g/l and used as a size for the abovementioned test papers A and B. The Cobb value of the sized test paper A is 58 and that of the sized test paper B is 29.

COMPARATIVE EXAMPLE 6

18.5 g of starch II are suspended in 400 ml of water and digested at 90° C., as described in Comparative Example 5. The mixture is then cooled to 85° C., and 0.5 g of 10% strength calcium acetate solution and 1 g of a 1% strength α-amylase A are added. AFter enzymatic degradation for 20 minutes at 85° C., the enzyme is deactivated by adding 4 ml of glacial acetic acid. The starch then has a $\eta_i$ value of 0.21 dl/g. The reaction mixture is then cooled to 30° C., a mixture of 46 g of acrylonitrile, 40.5 g of n-butyl acrylate and 15 g of tert-butyl acrylate is added and an initiator solution consisting of 1 g of potassium peroxydisulfate in 50 ml of water is also introduced. The mixture is stirred, heated to 80° C. and kept at this temperature for 3 hours. Polymerization is continued for 3 hours at 90° C., after which the mixture is cooled. A dispersion having a solids content of 20.4% and an LT value of 44 is obtained. The diameter of the dispersed polymer particles is 278 nm.

The polymer dispersion obtained in this manner is diluted to a solids content of 2.5 g/l and used for sizing the abovementioned test papers A and B. Test paper A then has a Cobb value of 95, and test paper B a Cobb value of 90.

We claim:

1. A paper size based on a finely divided, aqueous dispersion of a copolymer, obtained by copolymerization, by an emulsion polymerization method, of from 10 to 56 parts by weight of a monomer mixture of
   (a) from 20 to 65% by weight of acrylonitrile, methacrylonitrile, or a mixture thereof,
   (b) from 80 to 35% by weight of an acrylate of a monohydric, saturated $C_3$–$C_8$-alcohol and
   (c) from 0 to 10% by weight of other ethylenically unsaturated copolymerizable monomers, the sum of the percentages of (a), (b) and (c) always being 100, in 100 parts by weight of an aqueous solution of from 1.5 to 25% by weight of a degraded starch having a viscosity $\eta_i$ of from 0.12 to 0.50 dl/g, at from 40 to 100° C. in the presence of a peroxide-containing initiator.

2. A size as claimed in claim 1, wherein a monomer mixture of
   (a) acrylonitrile and
   (b) one or more of n-butyl, iso-butyl and tert-butyl acrylates are copolymerized.

3. A size as claimed in claim 1 or 2, wherein a monomer mixture which contains at least one of an ethylenically unsaturated $C_3$–$C_5$-carboxylic acid, vinyl sulfonate and 2-acrylamidopropanesulfonic acid as monomer (c) is copolymerized.

4. A size as claimed in claim 1 or 2, wherein a monomer mixture which contains at least one of di-$C_1$–$C_3$-alkylamino-$C_2$–$C_6$-alkyl (meth)acrylate, N-vinylimidazoline and N-vinyls-methylimidazoline or their quaternization products as monomer (c) is copolymerized.

5. A size as claimed in claim 1 or 2, wherein a monomer mixture which contains, as monomer (c), as least one of styrene, acrylamide, methacrylamide, a methacrylate and an acrylate which differs from the acrylates (b) is copolymerized.

6. A process for sizing paper which comprises sizing said paper with a copolymer obtained by copolymerization of from 10 to 56 parts by weight of a monomer mixture of
   (a) from 20 to 65% by weight of acrylonitrile, methacrylonitrile, or a mixture thereof,
   (b) from 35 to 80% by weight of an acrylate of a monohydric, saturated $C_3$–$C_8$-alcohol and
   (c) from 0 to 10% by weight of other ethylenically unsaturated copolymerizable monomers, the sum of the percentages of (a), (b) and (c) always being 100,
   in 100 parts by weight of an aqueous solution of from 1.7 to 21% by weight of a degraded starch having a viscosity $\eta_i$ of from 0.12 to 0.50 dl/g, at from 40 to 100° in the presence of a peroxide-containing initiator, as a size of paper.

* * * * *